Dec. 8, 1942.                    W. S. RIGBY                    2,304,599
                         ALTERNATING CURRENT MOTOR
                            Filed Aug. 3, 1940
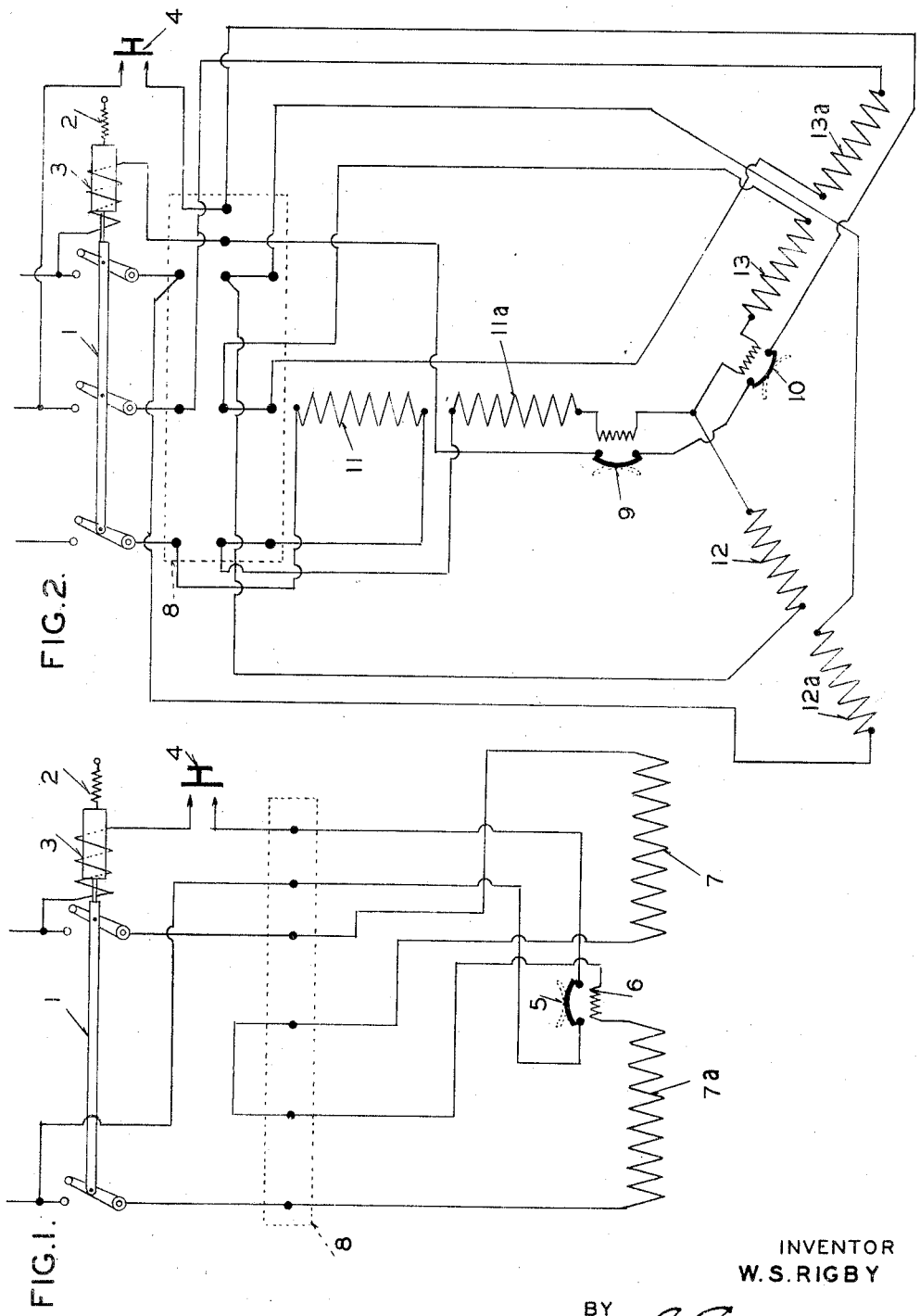
INVENTOR
W. S. RIGBY
BY
E. E. Huffman
ATTORNEY Patented Dec. 8, 1942

2,304,599

UNITED STATES PATENT OFFICE 2,304,599

ALTERNATING CURRENT MOTOR

Wesley S. Rigby, St. Louis, Mo., assignor to Wagner Electric Corporation, St. Louis, Mo., a corporation of Delaware Application August 3, 1940, Serial No. 350,872

2 Claims. (Cl. 172—274)

My invention relates to thermally protected alternating current motors and more particularly to double voltage motors, e. g., motors having such winding circuits and leads to motor terminals as to permit connections to be readily made whereby the motor may be operated from either 440 or 220 volt supply.

A commonly used form of thermal protective switch comprises a switch element which changes its shape at predetermined temperature, said element being so located as to be subject to heat developed in the motor and also being subject to heat developed in the heating coil located closely adjacent the element and traversed by current proportional to the load current of the motor. In thermal switches of the type just described the heating coil must be located very close to the thermal element and must be insulated therefrom. The difference in potential between the coil and the switch circuit should be substantially less than 300 volts if the spacing between the coil and the thermal element is sufficiently small for satisfactory operation.

It is the object of my invention to provide circuit arrangements whereby switches of the kind described may be used in motors operated from high voltage supply lines, for example, 440 volts.

In the accompanying drawings, Figure 1 diagrammatically illustrates circuits of a single phase motor including the motor terminals and the connections whereby the thermal switches of the kind referred to may be used under 440 volt operation; and Figure 2 is a similar illustration for a three phase motor connected for 440 volt operation. The motors of both figures are provided with terminals whereby they may be connected for 220 volt operation.

Referring to Figure 1, numeral 1 represents the line switch normally biased to open position by the spring 2 and in normal operation of the machine held closed by the solenoid 3. The circuit of this solenoid comprises a hand-operated switch 4 and a thermostatic control switch 5 with which is associated a heating coil 6. The motor winding is in two parts 7 and 7a and as indicated in the figure, six leads extend to the terminal board of the motor generally indicated by the dotted rectangle 8, four of these leads being for the purpose of making suitable winding connections for 440 or 220 volt operation for example and the other two leads extending from the thermostatic control switch 5. It will be noted that the heating coil 6 is located in the circuit between the winding parts 7 and 7a whereby, although the coil is traversed by the full load current of the motor, the difference of potential between it and the thermal switch 5 is half only of the line voltage. It will be understood that for 220 volt operation the terminal connections are so changed as to connect winding parts 7 and 7a in parallel, the heating coil 6 being in one of these parallel circuits.

In Figure 2, illustrating a double voltage polyphase motor, the connections shown being for 440 volt operation, there are nine motor leads in addition to the leads from the thermal switches, there being preferably two of these switches 9 and 10 connected in series whereby the motor will remain protected if any phase should become dead. 11 and 11a, 12 and 12a, and 13 and 13a represent the three phase winding, each divided into two parts and being "star" connected. It will be noted that the heating coils for the thermal switches 9 and 10 are located adjacent the "star" point whereby a motor winding is located between each heating coil and the line terminals with which it is in circuit. With this arrangement the potential difference between the heating coils and the thermal switches is, assuming 440 volts line voltage, 254 volts which is a safe voltage for this type of switch. As in the case of the single phase double voltage motor shown in Figure 1, the terminals shown in Figure 2 provide means for ready re-connection of the motor for 220 volt operation.

Having fully described my invention, what I claim as new and desire to secure by Letters Patent of the United States is:

1. In a three-phase motor having star connected working windings, a protective switch in the motor provided with a thermally responsive element and a heating coil cooperating therewith, said heating coil being connected between a working winding and the star point, and a line switch and control means therefor embodying a solenoid in circuit with the thermal element of the protective switch across the line and functioning to open the line switch when the temperature of the thermal element exceeds a predetermined value.

2. In an alternating current motor provided with windings and terminals whereby the windings may be connected for operation of the motor under either of two differing line voltages, a thermal protective switch in the motor provided with a heating coil so connected in relation to other circuit parts that when the windings are grouped for the higher operative voltage a working winding of the motor lies between the heating coil and each line terminal in circuit therewith, a solenoid controlled line switch, said thermal switch being in the solenoid circuit across the line and means moving the line switch to open position when the solenoid circuit is interrupted by opening of the thermal switch.

W. S. RIGBY.